United States Patent
Hudak

(10) Patent No.: US 11,857,841 B2
(45) Date of Patent: Jan. 2, 2024

(54) PERFORMANCE MONITORING SYSTEM FOR A PITCHER

(71) Applicant: John R. Hudak, Bayville, NJ (US)

(72) Inventor: John R. Hudak, Bayville, NJ (US)

( * ) Notice: Subject to any disclaimer, the term of this patent is extended or adjusted under 35 U.S.C. 154(b) by 292 days.

(21) Appl. No.: 17/495,909

(22) Filed: Oct. 7, 2021

(65) Prior Publication Data

US 2023/0113007 A1  Apr. 13, 2023

(51) Int. Cl.
*A63B 69/00* (2006.01)
*A63B 24/00* (2006.01)
*A63B 71/06* (2006.01)

(52) U.S. Cl.
CPC ...... *A63B 24/0062* (2013.01); *A63B 69/0002* (2013.01); *A63B 71/0622* (2013.01); *A63B 2069/0006* (2013.01); *A63B 2071/0647* (2013.01); *A63B 2220/58* (2013.01); *A63B 2220/833* (2013.01)

(58) Field of Classification Search
CPC ............ A63B 24/0063; A63B 69/0002; A63B 2069/0006; A63B 2220/58; A63B 2220/833
USPC ........................................................ 473/451
See application file for complete search history.

(56) References Cited

U.S. PATENT DOCUMENTS

| | | | |
|---|---|---|---|
| 4,925,186 A | 5/1990 | Stevenson et al. | |
| 6,616,556 B1 * | 9/2003 | Osmudsen | A63B 69/0002 473/218 |
| 8,308,615 B2 | 11/2012 | Vitolo | |
| 8,381,601 B2 | 2/2013 | Stumpf | |
| 9,022,884 B2 | 5/2015 | Dunno, Jr. | |
| 2011/0260890 A1 * | 10/2011 | Larsen | A63B 69/3667 341/20 |

(Continued)

FOREIGN PATENT DOCUMENTS

| | | |
|---|---|---|
| CA | 2283554 | 9/1999 |
| KR | 20140030540 A | 3/2014 |
| WO | WO2011020246 A1 | 2/2011 |

OTHER PUBLICATIONS

The First Stadium to Turn Football into Electricity—found at: https://barcainnovationhub.com/the-first-stadium-to-turn-football-into-electricity/ Published—Jun. 11, 2019—Barca Innovation Hub.

*Primary Examiner* — Mitra Aryanpour
(74) *Attorney, Agent, or Firm* — Ernest D. Buff & Associates, LLC; Ernest D. Buff

(57) ABSTRACT

A performance monitoring system includes a pitching mound, one or more processors, and a memory. The pitching mound includes a piezoelectric film associated with a pitching rubber, one or more rubber layers covering the piezoelectric film, a transmitter electrically coupled to the piezoelectric film, and a power source powering an amplifier associated with the piezoelectric film. The piezoelectric film generates electrical signals in response to pressure exerted on the pitching rubber. The processors are configured to receive the electrical signals generated by the piezoelectric film and transmitted by the transmitter. The processor is configured to analyze the received electrical signals based on training data using machine learning algorithms to determine at least one performance characteristic of the pitcher. The processors are configured to display on a display device the determined at least one performance characteristic in real-time.

11 Claims, 6 Drawing Sheets

(56) References Cited

U.S. PATENT DOCUMENTS

2014/0302950 A1* 10/2014 Burt .................. G09B 19/0038
    473/451
2015/0101731 A1   4/2015 Hepp
2023/0113007 A1* 4/2023 Hudak ............... A63B 71/0622
    482/8

* cited by examiner (a)

(b)

PERFORMANCE MONITORING SYSTEM FOR A PITCHER

BACKGROUND OF THE INVENTION

Field of The Invention

The present invention relates to a performance monitoring system for a pitcher; and more particularly to a performance monitoring system that evaluates at least one performance characteristic of the pitcher in real time during a game.

Description of the Prior Art

As is well known to those familiar with the games of baseball and softball, a pitcher throws the ball, directing it over home plate, and a batter attempts to hit the ball with a bat. It is a pitcher's objective to throw the ball at a high velocity, as this minimizes the batter's chances of hitting the ball. To facilitate the achievement of this objective, the pitcher's mound includes a pitching rubber. After wind up and during delivery of the ball, the pitcher pushes against the rubber and thereby "drives" the ball at a desired velocity. The force exerted by the pitcher against the rubber is known as the pitcher's "leg drive". It has been found that the velocity at which the ball is thrown can be increased by increasing the pitcher's leg drive force and the overall performance of the pitcher can be improved. However, there is a requirement for a pitching mound that would help to ensure uniform push pressure while throwing different pitches such as fastball, change-up and curveball.

A related art presents an apparatus to measure leg drive of a pitcher as the pitcher delivers a pitch. The device comprises a pressure gauge integrated into a pitching rubber to provide a pressure profile of the leg drive utilized by the pitcher during delivery of a pitch. The device evaluates the pitchers' performance, by determining if a pitcher has recovered from an injury, if a pitcher is tiring during a game, and provides a general indication of the pitchers ability to throw hard. The device could also be used as a training device, and used to coach pitchers into developing a strong leg drive. The device may further be used in conjunction with additional sensors to determine the turnover ratio of a pitcher, the time from when the front foot hits the front of the mound to when the back foot comes off the pitching rubber.

However, the devices used in the conventions arts lack a reliable technology to sense pitcher's characteristics in order to provide an accurate performance assessment.

Accordingly, there remains a need in the art for a system and method that can detect a pitcher's characteristics and provide a performance assessment in an accurate, reliable manner. Such a system would overcome the disadvantages and the limitations of systems and methods heretofore known. In addition, the system would provide technical advancements and economic benefits long sought for but as yet not realized by the conventional arts.

SUMMARY OF THE INVENTION

The present invention provides a performance monitoring system for a pitcher that accurately and reliably evaluates at least one performance characteristic of the pitcher in real time during a game such as softball, baseball or cricket.

Generally speaking, the system and method of the present invention provide an improved correlation between the amount of pressure exerted on the mound and the exertion level of the pitcher that examines, measures, and assesses the pitcher's athletic performance. The system helps to ensure uniform push pressure while throwing different pitches such as fastball, change-up and/or curveball. In addition, the system and method herein disclosed ensures that the pitcher's windup and push are substantially the same with every pitch.

In one aspect of the present invention, a performance monitoring system is provided. The performance monitoring system includes a pitching mound, at least one processor, and a memory. The pitching mound includes a piezoelectric film associated with a pitching rubber. At least one rubber layer covers the piezoelectric film. A transmitter is electrically coupled to the piezoelectric film. A power source powers an amplifier associated with the piezoelectric film and the transmitter. The piezoelectric film generates in real-time electrical signals responsive to pressure exerted on the pitching rubber. The memory is coupled to the at least one processor and includes computer-readable program code embodied in the memory that configures the processors to receive the electrical signals generated by the piezoelectric film and transmitted by the transmitter. The processors are configured to analyze the received electrical signals based on training data using machine learning algorithms to determine at least one performance characteristic of the pitcher. The processor is configured to display on a display device the determined at least one performance characteristic in real time during a game such as softball, baseball or cricket.

In another aspect, the pitching rubber comprises four sides, wherein each side includes a piezoelectric film disposed towards the edges along the pitching rubber's length. The pitching rubber is periodically rotated to expose one of the four sides of the pitching rubber. The at least one layer is 3D-printed over the piezoelectric film.

In yet another aspect, the piezoelectric film is glued over the pitching rubber using an adhesive. The pitching mound further includes a detecting means for detecting low electrical power level available in the power source. The amplifier amplifies the electrical signals generated by the piezoelectric film.

In yet another aspect, the training data comprises speed data, acceleration data, pace data, energy data, power data, and medical history data of one or more pitchers aggregated based on one or more performance criterion. The training data is updated based on the determined at least one performance characteristic of the pitcher.

In yet another aspect, the pitching mound includes four sides, where each side includes the piezoelectric film. The piezoelectric film is glued over the pitching mound through an adhesive. The pitching mound is periodically rotated to expose one of the four sides of the pitching mound. The one or more rubber layers are 3D-printed.

In yet another aspect, the at least one performance characteristic includes individual kinetic, musculoskeletal ability and aerobic capacity. The at least one performance characteristic may also include an effectiveness score and a tiredness score of the pitcher. Each of these performance characteristics are tracked in real time and displayed by the system during a game, such as softball, baseball or cricket.

The device, method and system disclosed herein may be implemented in any means for achieving various operational steps, and may be executed through the machine to achieve any of the operations disclosed herein. Other features will be apparent from the accompanying drawings and from the detailed description that follows.

BRIEF DESCRIPTION OF THE DRAWINGS

The invention will be more fully understood and further advantages will become apparent when reference is had to the following detailed description of the preferred embodiments of the invention and the accompanying drawings, in which.

Other features of the present embodiments will be apparent from the accompanying drawings and from the detailed description that follows.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description used herein are intended merely to facilitate an understanding of ways in which the embodiments herein may be practiced and to further enable those of skill in the art to practice the embodiments herein. Accordingly, the description or explanation should not be construed as limiting the scope of the embodiments herein.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The terms "like," "can be," "shall be," "could be," and other related terms herein disclosed in the foregoing and later parts of the specification in any means do not limit or alter the scope of the present invention. Such terms are provided to facilitate a more complete understanding of the present invention and its embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Figure 1:
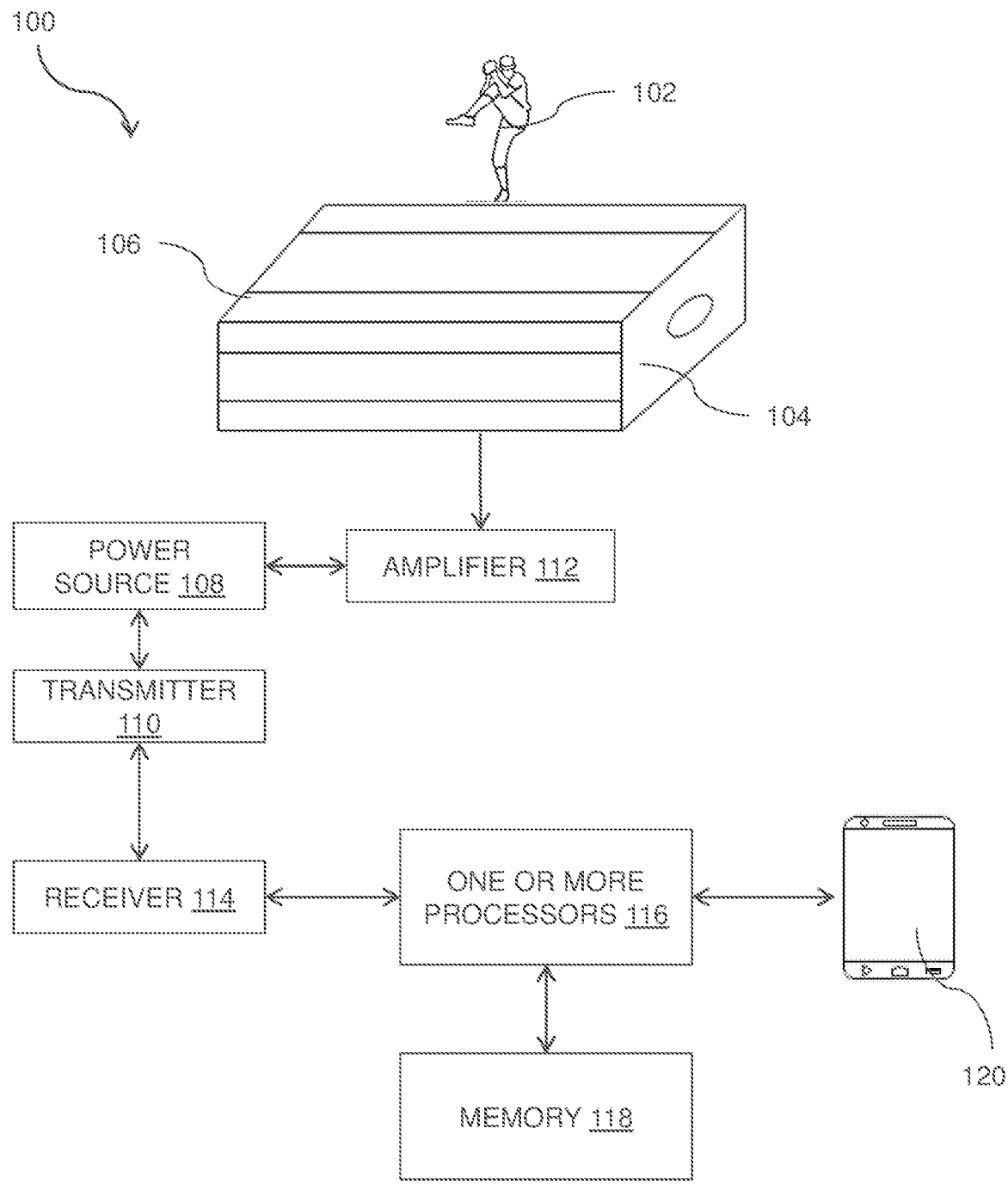
FIG. 1 illustrates a performance monitoring system for evaluating at least one performance characteristic of a pitcher, in accordance with the embodiments of the present invention.

FIG. 1 illustrates a performance monitoring system 100 for evaluating at least one performance characteristic of a pitcher 102, in accordance with the embodiments of the present invention. A pitcher as referred herein can be any player responsible to throw a ball while playing a game. A pitcher as referred to herein is a bowler in a game of baseball, however, the term "pitcher" should be construed as limiting to the game of baseball only. According to FIG. 1, the performance monitoring system 100 is illustrated which includes the pitcher 102, a pitching rubber 104, a piezoelectric film 106, a power source 108, the transmitter 110, an amplifier 112, a receiver 114, one or more processors 116, a memory 118, and a display device 120.

The performance monitoring system 100 includes the pitcher 102 which is a player throwing a ball to a catcher to strike out a batter. In another embodiment, the pitcher 102 is any person or individual who throws the ball towards a batsman aiming the strike zone and towards the catcher at high speed. The objective of the pitcher is to strike out the batsman by throwing a ball towards the strike zone at a speed high enough that the batsman may miss hitting the ball and enabling the catcher to catch the ball. The distance between the pitcher and the batter in a baseball field is approximately 18 meters. The pitcher in general is expected to throw the ball at a speed range of 70-90 mph in baseball. In an embodiment, the player throwing the ball may be playing any other game such as but not limited to, softball, cricket, throwball, and the like.

Further, the area of the strike zone is dependent on the height of the batter. Therefore, in order for the pitcher to throw a ball towards a strike zone continuously at a high speed, consistency in performance is essential.

The performance monitoring system 100 includes a pitching mound comprising the pitching rubber 104. In general, the pitching mound refers to an area on the field from where the pitcher throws the ball. In addition, the pitching mound is typically a circular or an oval shaped area devoid of grass. The pitching mound includes pitching rubber 104, which is placed at the center and is raised at a height of 10 inches above the height of the home plate.

In an embodiment, the pitching mound is a step plate mound or a non-step plate mound. In yet another embodiment, the pitching mound can be of any type based on ground conditions. In an embodiment of the present invention, the pitching mound is designed to be used in facilities, such as, schools, colleges, professional ballparks, and the like.

The pitching mound includes pitching rubber 104, with piezoelectric film 106 and one or more rubber layers to cover piezoelectric film 106. In an embodiment, the layers of rubber covering piezoelectric film 106, which are placed on the pitching rubber 104 and the step plate, can be 5 or more. In an embodiment, the pitching mound may include the pitching rubber 104 and the step plate (not shown) on which the pitcher 102 places his or her foot while throwing the ball. In an embodiment, the step plate is composed of rubber and also includes piezoelectric film 106. In an embodiment, the piezoelectric film 106 is placed on the pitching rubber 104 and the step plate in such a way that one-eighth of the pitching mound is covered by the piezoelectric film 106. In an embodiment, each of the underlying elements is covered by the rubber on top. In an embodiment, the underlying elements are covered by 1 or more different types of layers to include molded, 3D printed or other material.

In another embodiment, the pitching mound, including only the pitching rubber 104 and not the step plate, may include the piezoelectric film 106 covering one-fifth of the pitching mound.

In an embodiment, the pitching rubber 104 may have piezoelectric films 106 placed on all four sides of the pitching rubber 104. In an embodiment, the pitching rubber 104 may be periodically rotated to expose one of the four sides of the pitching rubber 104. The piezoelectric film 106 includes one or more piezoelectric sensors. In an embodiment of the present invention, the piezoelectric film 106 is glued over the pitching rubber 104 or the step plate using an adhesive. In an embodiment, the pitching rubber 104 is periodically rotated to expose one of the four sides of the pitching rubber 104 to increase the life of the pitching rubber 104.

Figure 2:
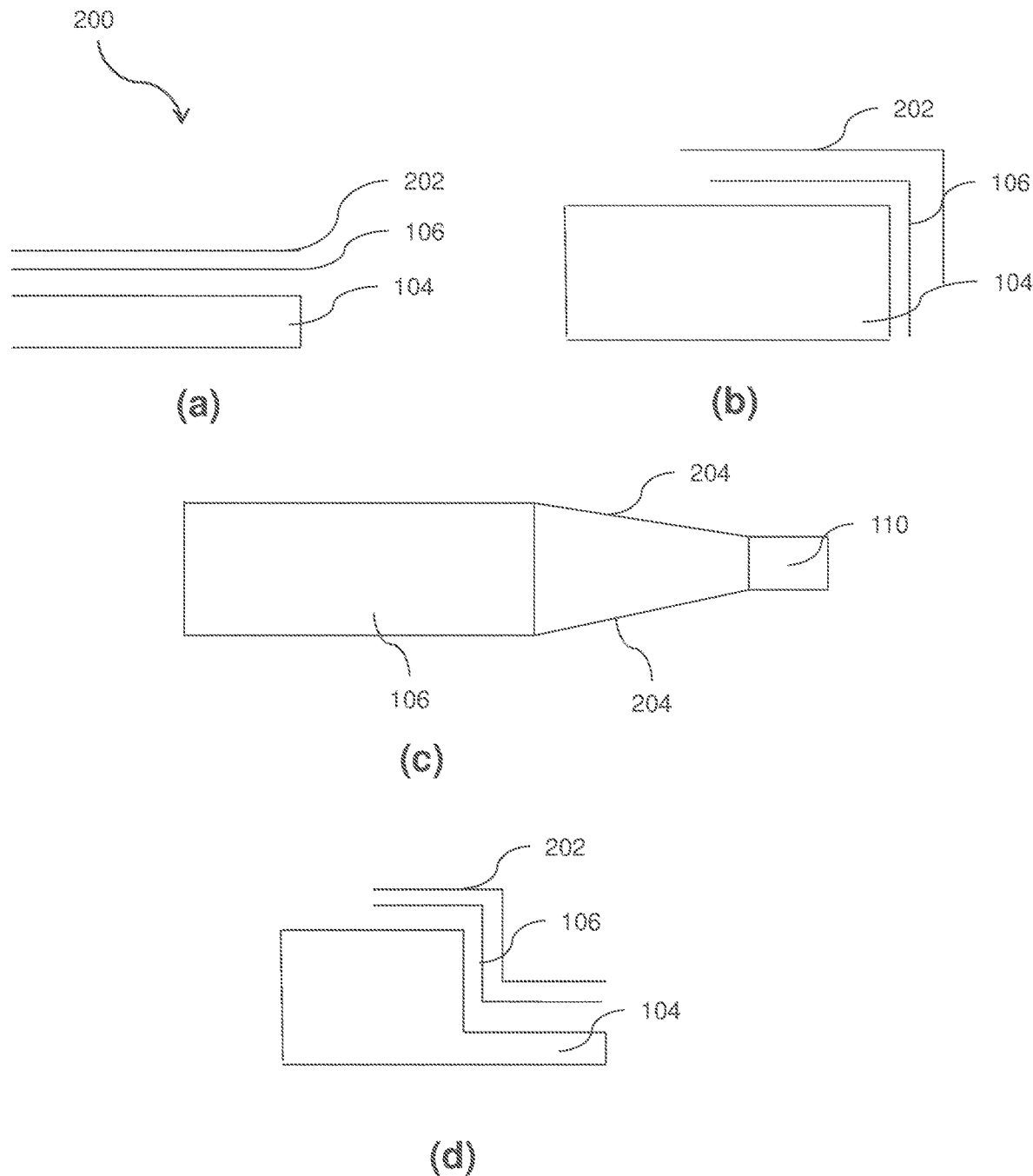
FIGS. 2(a) and 2(b) illustrate various alternative views of a pitching rubber, in accordance with the first embodiment of the present invention.
FIG. 2(c) illustrates a piezoelectric film attached to the pitching rubber connected to a transmitter through connecting leads, in accordance to an embodiment of the present invention.
FIG. 2(d) illustrates a step plate which is used with the pitching rubber, in accordance to an embodiment of the present invention.

FIGS. 2(a) and 2(b) illustrate various alternative views of the pitching rubber 104, in accordance with the first embodiment of the present invention. The pitching rubber 104 includes the one or more rubber layers 202 placed over the piezoelectric film 106. In an embodiment, the one or more rubber layers 202 include at least five rubber layers. In an embodiment, the one or more rubber layers 202 protect the piezoelectric film 106 underneath. In addition, the one or more rubber layers 202 are placed over the piezoelectric film 106 to protect the underlying elements. In an embodiment of the present invention, the one or more rubber layers 202 are 3D-printed over the piezoelectric films 106. FIG. 2 (b) discloses that the pitching rubber 104 includes piezoelectric film 106 on the edges towards the sides of the length of the pitching rubber 104.

FIG. 2(c) illustrates the piezoelectric film 106 attached to the pitching rubber 104 connected to a transmitter through connecting leads, in accordance with an embodiment of the present invention. As shown in FIG. 2(c) the piezoelectric film 106 provided on the pitching rubber 104 is electrically connected to the transmitter 110 through connecting leads 204. The transmitter 110 transmits signals sensed from the piezoelectric sensors to the one or more processors 116. In an embodiment, the transmitter 110 transmitting the electrical signals to the one or more processors 116 can be CC1050 or CC1070 from Chipcon Products from Texas Instruments.

FIG. 2(d) illustrates a step plate which configured for use with the pitching rubber 104, in accordance to an embodiment of the present invention. The step plate as shown in FIG. 2(d) is a step like structure with piezoelectric film 106 provided on each step surface and one or more layers of rubber 202 covering the piezoelectric film 106.

The performance monitoring system 100 of FIG. 1 includes the power source 108 connected to the piezoelectric film 106. In an embodiment, the power source 108 is electrically coupled to one or more piezoelectric sensors which, in turn, are coupled to the piezoelectric film 106. In an embodiment, the pitcher 102 exerts pressure on pitching rubber 104 and the piezoelectric film 106 while pitching the ball. As a result, the exerted pressure is sensed by the piezoelectric film 106, which produces an electrical charge proportional to the pressure exerted. The one or more piezoelectric sensors may include the amplifier 112 to convert and amplify the electrical charge to a voltage output. Pressure exerted by the pitcher 102 is thereby converted into electrical signals by the piezoelectric film 106; the electrical signals are sensed by the piezoelectric sensors. Power source 108 powers the amplifier 112 and the transmitter 110. The power source 108 may include one or more chargeable or replaceable batteries. In an embodiment, the power source 108 may include a secondary battery for emergency use. In an embodiment, the power source 108 may be connected to a power line supplying the electrical power to the piezoelectric film 106 and the transmitter 110. In cases where the power supply in the power line is disrupted, the secondary battery may be used to power the piezoelectric film 106 and the transmitter 110. Actuation of the secondary battery may be triggered manually at the discretion of the user, or automatically in response to disruption of the power line.

Further, the power source 108 is connected to a detecting means enabled by the one or more processors 116 for detecting disruption of power in the power line or insufficient electrical power stored in the power source 108 or the secondary battery as the case may be. A low battery signal may be generated and transmitted by the transmitter 110 and received by the receiver 114 connected to the one or more processors 116. As a result of the low battery signal, a notification may be displayed by the detection means enabled by the one or more processors 116 on the display device 120. The notification may alert the user to restore the power or replace the batteries as the level of power stored in the power source 108 is below a threshold level. In an embodiment, the threshold level of the power stored in the power source at which an alert is displayed is, but is not limited to, 20%, 10% and/or 5%. In an embodiment, the trigger warning may be enhanced by actuating an alarm together with the notification if the battery power level is below 5%, indicating that the battery may be recharged or replaced to enable proper functioning of the piezoelectric film 106.

In an embodiment, the display device 120 may be a device operated by one or more users such as customers of an entity or a brand, where the entity can be a provider of items, including products and services. The display devices 120 can include a variety of computing systems, including but not limited to a laptop computer, a desktop computer, a notebook, a workstation, a portable computer, a personal digital assistant, a handheld device and a mobile device.

The performance monitoring system 100, including the one or more processors 116, may use one or more algorithms related to machine learning or artificial intelligence, which are trained using training data. In an embodiment, the training data includes but may not be limited to speed data, acceleration data, pace data, energy data, power data, and medical history data of one or more players. In addition, the training data refers to historical data and real-time data associated with the pitcher's historical optimal performance. One or more algorithms may use one or more statistical and analytical related algorithms to define threshold levels to determine a score related to each of the performance parameters. One or more algorithms used may be implemented using various machine learning trained models, deep learning models, artificial neural networks, fuzzy logic control algorithms, and the like. The artificial intelligence can be implemented by the one or more processors and memory. The processors can dynamically update the computer-readable instructions based on various learned and trained models.

In an embodiment, the performance parameters include a score which indicates a level of performance of the pitcher such as: good, average and below average. In an embodiment, the thresholds may be updated in real-time based on the real-time performance of a player to measure consistency in the performance of the players during a game such as softball, baseball, cricket or throwball. In an embodiment, a universal set of thresholds are defined which may be applicable to all players, along with a custom set of thresholds that are unique to each player. In an embodiment, a comparative analysis of performance may be carried out by comparing the performance of one or more players with another based on the universal set of thresholds and a custom set of thresholds.

In an embodiment, threshold data includes one or more threshold sets and levels of each of the performance parameters such as but not limited to pitcher's individual kinetic, musculoskeletal ability, and/or aerobic capacity. The threshold levels may indicate a poor threshold range, an acceptable or an average performance threshold range and a good performance threshold range for each performance characteristic.

The one or more processors 116 then analyze the electrical signals based on the training data using machine learning algorithms. In an embodiment of the present invention, the machine learning algorithms are utilized by the one or more processors 116 to determine performance parameters of the pitcher to indicate how the pitcher is performing during a game, based on the threshold ranges defined. The one or more processors 116 may determine one or more statistics and provide prediction information related to the performance characteristics of the pitcher 102. The at least one performance characteristic of the pitcher 102 may include but not be limited to the pitcher's individual kinetic, musculoskeletal ability, and/or aerobic capacity.

In an embodiment, the one or more processors 116 may also utilize the machine learning algorithms to assess the effectiveness and tiredness of the pitcher 102 during a game. In an embodiment, the machine learning algorithms improve the predictive modeling and analytics of the performance monitoring system 100. In an embodiment, the analysis of the electrical signals is compared with the training data to evaluate optimal corrective and performance training exercises, which may serve as blueprints for tracking the performance characteristics. In an embodiment, the one or more processors 116 are configured to track the effectiveness of the pitcher 102 and tiredness of the pitcher 102. In addition, the one or more processors 116 are configured to predict pitcher's effectiveness for the upcoming innings or games. In an embodiment, the one or more processors 116 are configured to predict pitcher's onslaught of injuries and generate blueprints of optimal corrective and performance training exercises that may prevent injuries prevalent during the game or specific to a particular pitcher based on his performance and injury history.

The performance monitoring system 100 includes a memory 118. The one or more processor(s) 116 may be implemented as one or more microprocessors, microcomputers, microcontrollers, digital signal processors, central processing units, logic circuitries, and/or any devices that manipulate data based on operational instructions. Among other capabilities, the one or more processor(s) 116 are configured to fetch and execute computer-readable instructions stored in memory 118 of the performance monitoring system 100. The memory 118 may store one or more computer-readable instructions or routines, which may be fetched and executed to create or share the data units over a network service. The memory 118 may comprise any non-transitory storage device, including, for example, volatile memory such as RAM, or non-volatile memory such as EPROM, flash memory, and the like.

The performance monitoring system 100 comprises the display device 120. In an embodiment of the present invention, the display device 120 includes but may not be limited to a smartphone, a computer, and a television. In an embodiment of the present invention, the one or more processors 116 are configured to display at least one performance characteristic of a pitcher on the display device 120. In an embodiment, the one or more processors 116 may provide a comparative analysis of the performance of one or more pitchers to a user of the display device 120.

FIG. 3(a) illustrates various alternative views of the pitching rubber 104, in accordance with an embodiment of the present invention.

According to FIG. 3(a), the pitching rubber 104 is illustrated in rectangular shape with the one or more rubber layers 202 and the piezoelectric film 106.

Figure 3:
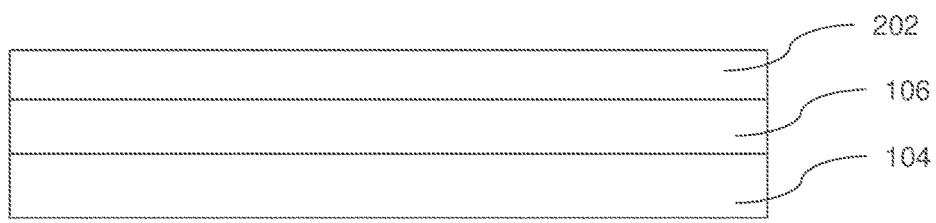
FIGS. 3(a) and 3(b) illustrate various alternative views of the pitching rubber, in accordance with the second embodiment of the present invention.
Figure 3:
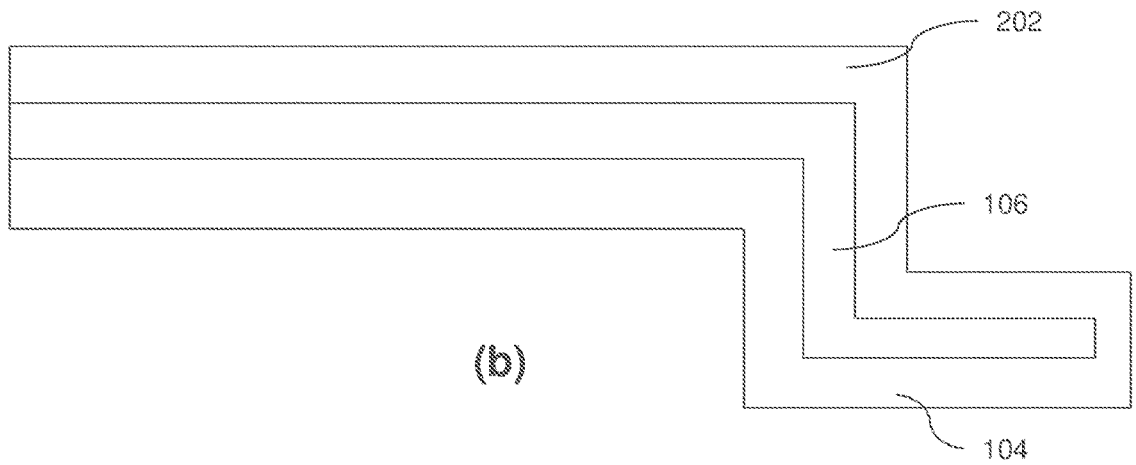

According to FIG. 3 (b), the pitching rubber 104 is illustrated in a shape having a rectangular body and a step extension on the length side of the rubber 104 with the one or more rubber layers 202 and the piezoelectric film 106 covering the rubber 104.

Figure 4:
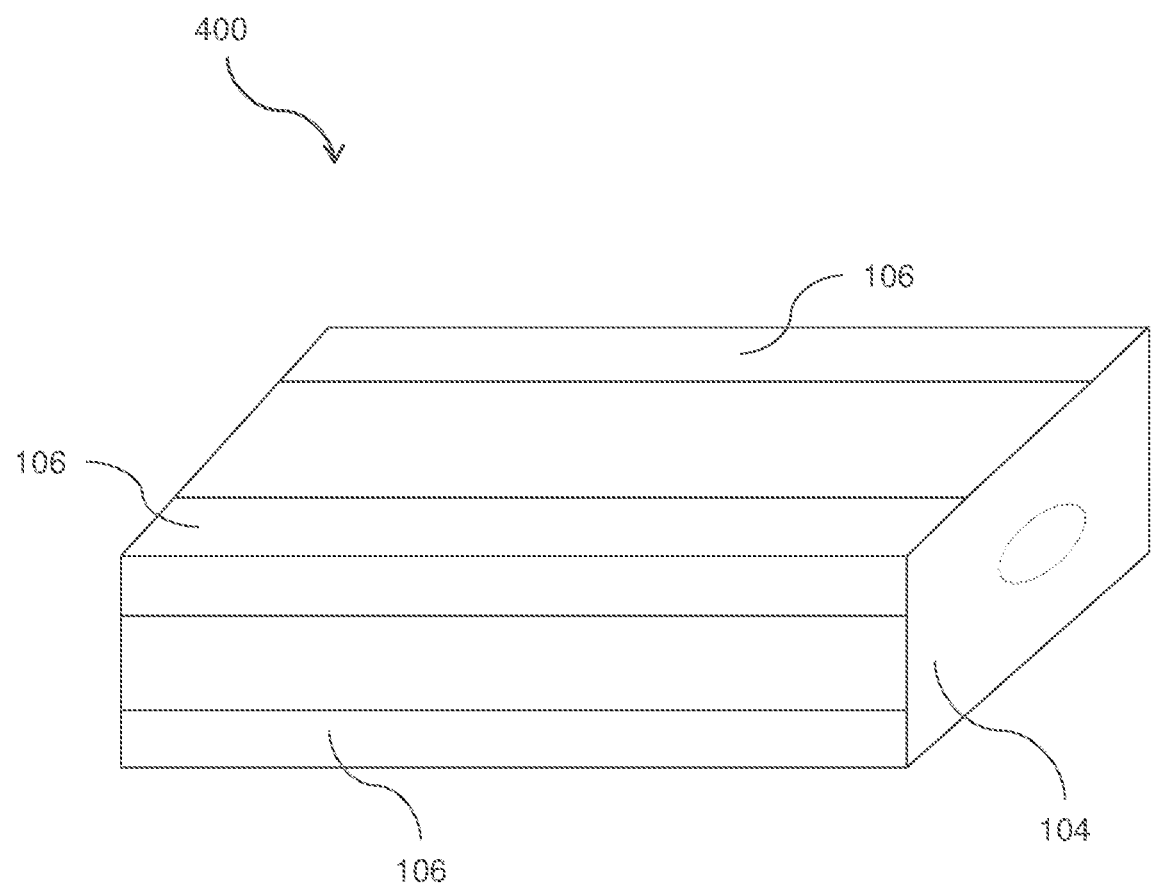
FIG. 4 illustrates a four sided pitching rubber, in accordance with the second embodiment of the present invention.

FIG. 4 illustrates a four-sided pitching rubber 104, in accordance with the second embodiment of the present invention. According to FIG. 4, the pitching rubber 104 is shown to have piezoelectric film 106 placed on all four sides and edges on the length of the pitching rubber 104. The pitching rubber 104 comprises a hollow cylinder in the center of the pitching rubber 104. In use the pitching rubber 104 is filled with mud in the hollow cylinder and the piezoelectric film 106 along with sensors generate electrical signals when a pitcher exerts pressure on the pitching rubber 104 with his foot while pitching a ball. In an embodiment, the pitching rubber 104 is associated with spikes and or dual stanchion structures. In an embodiment, the pitching rubber 104 may be installed on or about the center of the mound.

Figure 5:
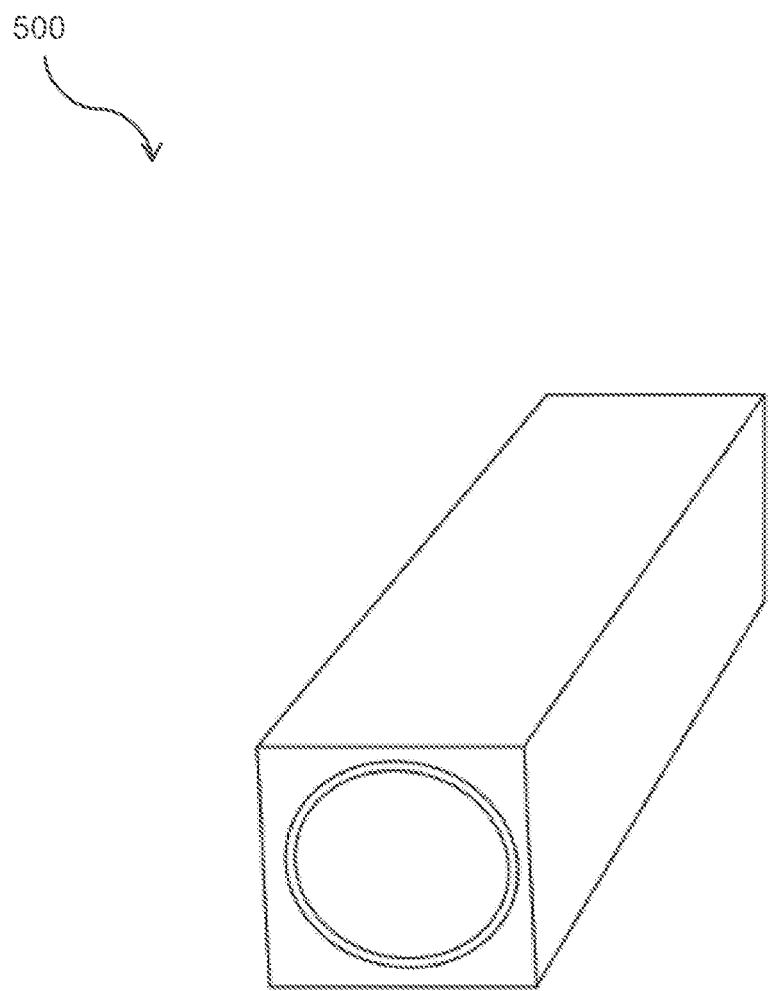
FIG. 5 illustrates a perspective view of the pitching rubber, in accordance with the second embodiment of the present invention.

FIG. 5 illustrates a perspective view of the pitching rubber 104, in accordance with the second embodiment of the present invention.

Figure 6:
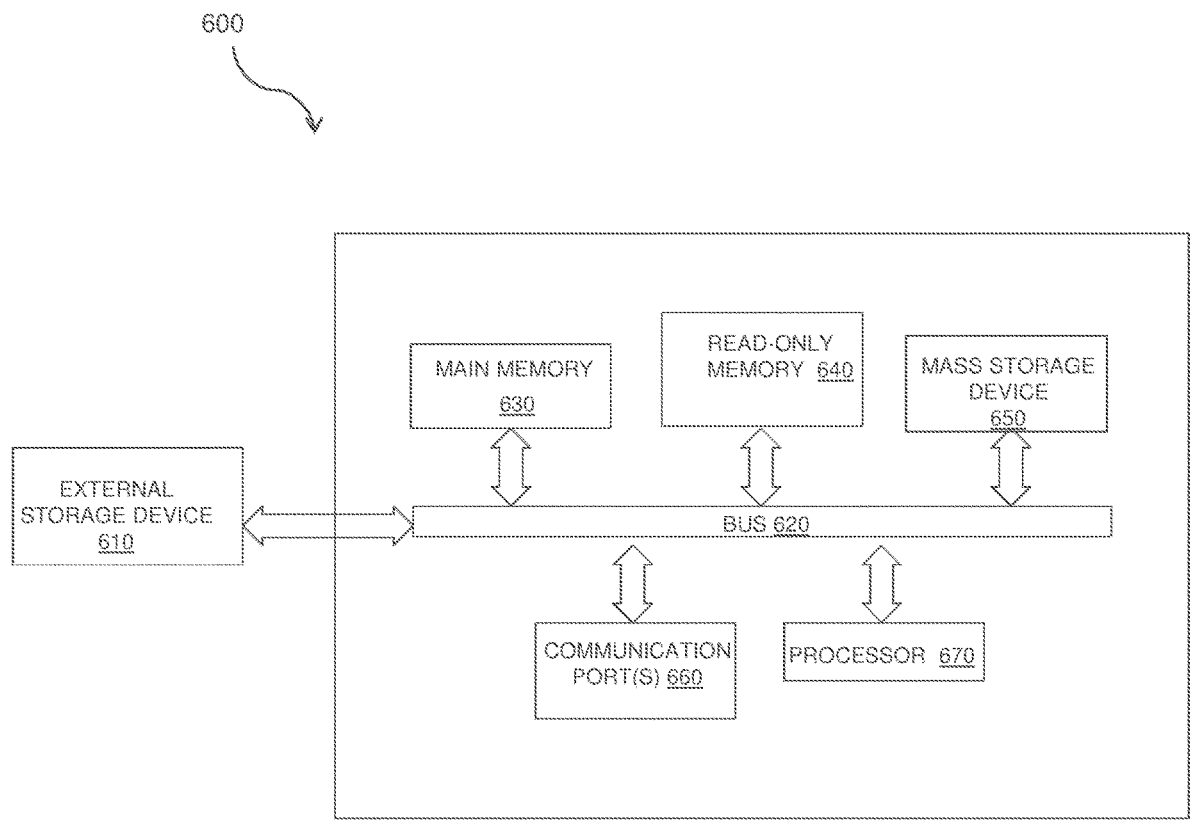
FIG. 6 illustrates an exemplary computer system to implement the proposed system in accordance with embodiments of the present invention.

FIG. 6 illustrates an exemplary computer system 600 to implement the proposed system in accordance with embodiments of the present invention.

As shown in FIG. 6, the computer system can include an external storage device 610, a bus 620, a main memory 630, a read-only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processor or other future processors. Processor 670 may include various modules associated with embodiments of the present invention. Communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which the computer system connects.

Memory 630 can be Random Access Memory (RAM), or any other dynamic storage device commonly known in the art. Read-only memory 640 can be any static storage device(s), e.g., but not limited to, a Programmable Read-Only Memory (PROM) chips for storing static information, e.g., start-up or BIOS instructions for processor 670. Mass storage 650 may be any current or future mass storage system, which can be used to store information and/or instructions. Exemplary mass storage systems include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to the software system.

Optionally, operator and administrative interfaces, e.g., a display, keyboard, and a cursor control device, may also be coupled to bus 620 to support direct operator interaction with the computer system. Other operator and administrative interfaces can be provided through network connections, which are connected through communication port 660. External storage device 610 can be any kind of external hard drives, floppy drives, IOMEGA® Zip Drives, Compact Disc—Read-Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present invention.

Embodiments of the present invention may be implemented entirely by hardware, entirely by software (including firmware, resident software, micro-code, and the like) or combining software and hardware implementation that may all generally be referred to herein as a "circuit," "module," "component," or "system." Furthermore, aspects of the present invention may take the form of a computer program product, comprising one or more computer-readable media having computer-readable program code embodied thereon.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular configuration, method or operating system named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document the terms "coupled to" and "coupled with" are also used euphemistically to mean "communicatively coupled with" over a network, where two or more devices are able to exchange data with each other over the network, possibly via one or more intermediary device.

While the foregoing describes various embodiments of the invention, other and further embodiments of the invention may be devised without departing from the basic scope thereof. The invention is not limited to the described embodiments, versions or examples, which are included to enable a person having ordinary skill in the art to make and use the invention when combined with information and knowledge available to the person having ordinary skill in the art.

Having thus described the invention in rather full detail, it will be understood that such detail need not be strictly adhered to, but that additional changes and modifications may suggest themselves to one skilled in the art, all falling within the scope of the invention as defined by the subjoined claims.

I claim:

1. A performance monitoring system, comprising:
   a pitching mound comprising:
   a piezoelectric film associated with a pitching rubber, wherein the piezoelectric film generates electrical signals in real-time in response to pressure exerted on the pitching rubber;
   one or more rubber layers covering the piezoelectric film;
   a transmitter electrically coupled to the piezoelectric film; and
   a power source powering an amplifier associated with the piezoelectric film and the transmitter;
   one or more processors; and
   a memory coupled to the one or more processors and comprising computer readable program code embodied in the memory that configures the processors to:
   receive the electrical signals generated by the piezoelectric film and transmitted by the transmitter;
   analyze the received electrical signals based on training data using machine learning algorithms to determine at least one performance characteristic of a pitcher; and
   display on a display device the determined at least one performance characteristic in real-time.

2. The performance monitoring system as recited by claim 1, wherein the pitching rubber comprises four sides, and each of said sides includes a piezoelectric film disposed towards the edges and along the length thereof.

3. The performance monitoring system as recited by claim 2, wherein the pitching rubber is periodically rotated to expose one of the four sides of the pitching rubber.

4. The performance monitoring system as recited by claim 1, wherein the one or more rubber layers are 3D-printed over the piezoelectric film.

5. The performance monitoring as recited by claim 1, wherein the piezoelectric film is glued over the pitching rubber using an adhesive.

6. The performance monitoring system as recited by claim 1, wherein the pitching mound further comprises a detecting means for detecting low electrical power level available in the power source.

7. The performance monitoring system as recited by claim 1, wherein the amplifier amplifies the electrical signals generated by the piezoelectric film.

8. The performance monitoring system as recited by claim 1, wherein the training data comprises speed data, acceleration data, pace data, energy data, power data, and medical history data of one or more pitchers aggregated based on one or more performance criterion.

9. The performance monitoring system as recited by claim 1, wherein the at least one performance characteristic comprises one or more of individual kinetic, musculoskeletal ability and aerobic capacity.

10. The performance monitoring system as recited by claim 1, wherein the at least one performance characteristic comprises an effectiveness score and a tiredness score of the pitcher.

11. The performance monitoring system as recited by claim 1, wherein the training data is updated in real time and displayed during a game based on the determined at least one performance characteristic of the pitcher.

* * * * *